United States Patent [19]

Rosenfeld

[11] Patent Number: 4,686,937
[45] Date of Patent: Aug. 18, 1987

[54] CAT BOX LITTER AND PROCESS FOR PRODUCING SAME

[76] Inventor: John Rosenfeld, 500 Keele Street, Toronto, Ontario, Canada, M6N 3C9

[21] Appl. No.: 680,527

[22] Filed: Dec. 11, 1984

[51] Int. Cl.⁴ ............................................. A01K 1/015
[52] U.S. Cl. ....................................................... 119/1
[58] Field of Search ....................... 119/1; 71/4, 64.04; 502/80

[56] References Cited

U.S. PATENT DOCUMENTS

| | | | |
|---|---|---|---|
| 3,244,635 | 4/1966 | Duke | 502/80 |
| 3,789,797 | 2/1974 | Brewer | 119/1 |
| 4,157,696 | 6/1979 | Carlberg | 119/1 |
| 4,163,674 | 8/1979 | Been | 119/1 X |
| 4,187,803 | 2/1980 | Valenta | 119/1 |
| 4,206,718 | 6/1980 | Brewer | 119/1 |
| 4,278,047 | 7/1981 | Luca | 119/1 |
| 4,506,628 | 3/1985 | Stockel | 119/1 |

*Primary Examiner*—Robert P. Swiatek
*Attorney, Agent, or Firm*—Marcus & Associates

[57] ABSTRACT

A process is provided herein for making absorptive pellets from clay "fines" having open pore spaces therein, the fines including clay particles that will pass through a 30-50 mesh screen. The process includes the steps of (a) mixing the clay "fines" in a mixing apparatus with an aqueous solution of lignin; then (b) transferring the moistened clay-lignin particles from the mixing apparatus to a disc pelletizer having a screw conveyor to feed the moistened clay-lignin particles to a die, the die including a die stiffener ring, a roll assembly, an adjustable feed plow and a rapid pelletizing cartridge; and finally (c) forcing the moistened clay-lignin particles through the die to compact and to form the clay-lignin particles into a coherent mass of material and cutting that coherent mass from the die to form the material into pellets, the forcing through the disc pelletizer being under selected conditions of shear substantially simultaneously to compact the clay-lignin particles into the coherent mass and to flash-off excess moisture to provide pellets having a maximum of about 5% by weight moisture and so that a subsequent drying step is therefore unnecessary. The pellets so formed may be used as cat box litter, since they are absorptive pellets having an absorption capacity in the open pore spaces approaching the capacity of the clay "fines" starting material, i.e. about 90-95% of the pore volume of the clay fines. It is believed that the lignin expands during the drying process to improve the pore volume of the pellets.

20 Claims, 1 Drawing Figure

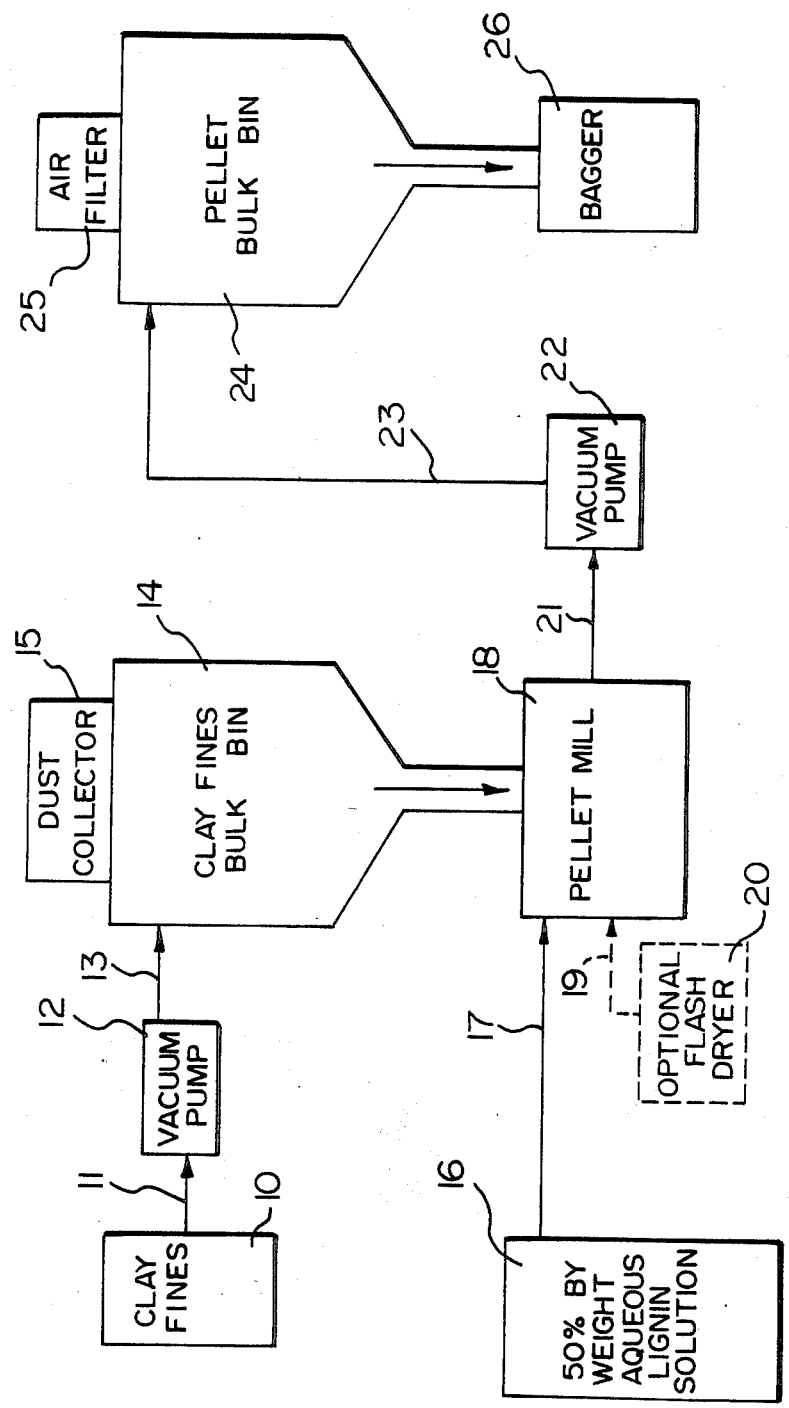

CAT BOX LITTER AND PROCESS FOR PRODUCING SAME

BACKGROUND OF THE INVENTION (i) Field of the Invention

The present invention relates to the production of pellets from highly absorptive solid materials "fines" i.e. particles of a size of less than 30–50 mesh, expecially useful as cat litter.

(ii) Description of the Prior Art

For the purpose of this invention, the term "highly absorptive solid material" is defined as clays, diatomaceous earths, Fuller's earths, and bentonites, that are low in bulk density, usually less than about 45 lbs/cu. ft., and have the ability to absorb liquids into their pores. Such materials usually contain more than one component but most often have a high percentage of kaolinite, or attapulgite, or montmorillonite, or sepiolite, or diatomite. Generally such a material that has any of the above as the major component is very likely to have lesser amounts of one or all of the others. Any of the other known clay minerals, e.g. kaolinite and illite are commonly present and non-clay minerals and/or siliceous materials that cannot be classified as diatomaceous earth may be present. Typical of the latter is silica sand, limestone, iron oxide and gypsum.

Another useful clay material is Georgia clay. Georgia clay is a naturally occurring clay mineral consisting predominantly of the clay mineral kaolinite, a crystalline hydrated aluminum silicate of the formula $Al_2O_3 \cdot 2SiO_2 \cdot 2H_2O$. This clay mineral is rarely found pure, but is the main constituent of kaolin whose composition is about 40% alumina, about 55% silica, plus impurities and water. Kaolin is also known as china clay; white bole; argilla; porcelain clay; white clay; and is a white-burning clay, which, due to its great purity, has a high fusion point and is the most refractory of all clays.

Such materials, which are used as industrial absorbents, soil conditioners, decorative mulch herbicides, insecticide carriers, cat box absorbent and sanitary absorbents, are generally mined, dried and/or calcined, crushed and screened to a particle size, which depends on the particular use to which it will be applied. This crushing and screening inevitably leads to a waste product known as "fines", which can be defined as a range of particles less than 30–50 mesh in size. While the "fines" from some specially selected and/or further processed such material can be used, for instance, attapulgite as drilling mud, it is generally accepted within the industry that such materials which are best suited as an absorbent or for decorative purposes and which grade down from 30–50 mesh have little market demand. In some products, depending on desired final particle size "fines" can be generated in an amount equal to about 10% to about 60% of the final merchantable product and for some products, e.g. 16/30, 30/60 and 24/84 insecticide grades, the "fines" lost will be on the high side of the above range. Obviously, if these "fines" cannot be used they represent an economic loss to the manufacturer and in fact created a disposal problem.

Various methods have been advanced for pelletizing "fines" which generally involve processing the "fines" by compressing them into pellets of a useable size. These methods have proven satisfactory for pelletizing plastic, nonabsorbent clay "fines". Processes for pelletizing sorptive mineral "fines" which use colloidal clay as a binder by agglomeration have also been advanced but for the most part have been unsatisfactory because it is difficult to control the pellet size and strength and the resulting pellets are unstable under certain environmental conditions and lack the qualities of the sorptive mineral.

Procedures have been proposed for treating such clays to enable the production of pastes and/or pellets therefrom. In one procedure, in U.S. Pat. No. 1,394,241 patented Oct. 18, 1921, by E. Weber, clay pastes are provided which contain, in addition to water, various vegetable extracts. Such vegetable extracts include the saponaceous bodies and extracts or matter having their origin from the disintegration of cellulose (lignin). Among the useful saponaceous substances were pure saponins, githagin, quillaja and senegin. Extracts of any saponin-bearing plants, barks, roots, bulbs, fruits, such as of the quillaia, of soapwort, a cock-wheed, of sow-breads, and more generally of the saponin-bearing plants, as well as decoctions of ivy and of capsules of the chestnut, and neutral water soluble saponins were also said to be useful. In addition cellulose-waste and cellular pitch, alkaline waste-lyes and sulfite-cellulose may also be used.

The object of such addition was, however, not to be able to produce absorptive pellets from clay fines, but, in fact to improve the pouring of clay-pastes or unplastic stiff pulps through the use of alkali, mixed with a small percentage of those vegetable extracts.

Allen, in U.S. Pat. No. 2,765,238 patented Oct. 2, 1956, provided reinforcing pigment produced by precipitating lignin from an aqueous solution in which there is hydrated silica or silicate, or a mixture thereof. The hydrated silica and silicate could be present either in the aqueous solution or suspended therein in very finely divided form. In the product, lignin was preferably present as a coating. The aim of that invention was, however, to provide calcium silicate pigment which could be used in rubber compounding and which would disperse well in rubber. There is no subbestion of providing absorptive pellets from clay fines.

Gmeiner, in U.S. Pat. No. 2,839,415 patented June 17, 1958, provided a procedure for the manufacture of clay products, which involved the addition of waste sulfite liquor, which had been previously concentrated to the natural clay and/or shale body. This is the liquor which results from the treatment of wood in making pulp by the sulfite process, wherein the cellulose fibers are liberated from the wood by the employment of an aqueous solution of sulfurous acid in which a calcium, magnesium or ammonia base has been dissolved. The waste sulfite liquor thus obtained contains the soluble products of digestion, which amount to about 50 percent or more of the original wood substance. Although the exact composition of the waste liquor is not completely known it is believed to include lignin, carbohydrates, proteins, resin, fat, sulfur dioxide combined with lignin, and the calcium salt of lignosulfonic acid for the magnesium or ammonia salt, if either of the latter are used as a base for the sulfurous acid used in the digestor. It also contains lignin sulfonates, i.e. metallic sulfonate salts made from the liquor of sulfur pulp mill liquors. The patentee was concerned with the problem of improving the strength, both in the unfired and fired state of clay products, and, therefore, reduce the loss in manufacturing and handling. That patentee was not concerned with the provision of absorptive pellets from clay fines.

Herdrich in U.S. Pat. No. 3,536,503 patented Oct. 27, 1970, provided a bloated clay by adding a solution of additives to the clay which, during the dripping process were capable of forming a solidified shell around the granule. The additives acted as binders and were set or cured at low temperatures below about 300° C., preferably just above about 100° C. One suitable solution suggested was, sulfite waste liquor which had the advantage of being economic and available in large amounts. Powdered fluxing agents and gastifiable bloating adjuvants were also added in suspension or emulsion. This patentee thus intended to provide a combination of additives which allowed converting almost any plastic clay to a bloating clay of desired low bulk density and low water absorbency. He was not concerned with the provision of absorptive pellets from clay fines.

Parmella, in Canadian Pat. No. 641,299 issued May 15, 1902, provided a process for the production of pellets from particulate solid materials which comprised forcing the particulate material through a cylindrical die of such proportions that the ratio of the diameter to the length in the range of 1:5 to 1:15, the die having been previously conditioned by forcing therethrough particulate material comprising a lubricant. The patentee was thus concerned with a pelletizing of powdered material to produce pellets which had good mechanical strength. He was not concerned with the provision of absorptive pellets from clay fines.

Valenta, in U.S. Pat. No. 4,036,928 patented July 19, 1977, addressed the problem of pelletizing absorptive clay fines for use as, e.g. animal liter. According to that patentee, "fines" of a sorptive mineral, e.g., fuller's earth or diatomaceous earth, were mixed with sufficient moisture to just fill the pore space in the particles. In one instance water was added in an amount equal to between about 30 to about 45 percent by weight to the "fines". Once the "fines" and moisture were mixed in a cement-type mixer, ribbon blender or other suitable mixing device, they were then placed in a pelletizing machine were the moistened "fines" were compactly formed into pellets by forcing the mixture through a die. After the pellets were formed they were cut to the desired size. The pellets were then dried, driving the water from the pore space, with the result that the pellets had substantially the same absorbent capacity and bulk density as the original material.

The process was not, however, economically viable because of the added expensive drying step after the pellets had been formed.

Animal litter had also been made from waste rejects from a secondary fiber plant. In U.S. Pat. No. 4,341,180 patented July 27, 1982, by L. R. Cortigene et al, an animal litter was provided by the steps of partially de-watering waste rejects from a secondary fiber plant to a consistency such that the partially de-watered waste could be formed into pellets, forming the partially de-watered waste into pellets, and then drying the pellets, in which the partially de-watered waste contained from about 32 percent to about 40 percent water. The animal litter so prepared comprised pelleted and dried rejects of a secondary fiber plant containing a deodorizer material produced by de-watering rejects of a secondary fiber plant, cutting the rejects into small pieces, incorporating therewith a deodorant material, pelletizing and drying.

The deodorant material, advantageously, is sodium bicarbonate which, advantageously, is present in an amount of between about 1 percent to about 10 percent, preferably about 5 percent, based on the dry weight of the litter. The sodium bicarbonate may be partially or totally replaced by other suitable deodorants, for example, chlorophyll, sodium dihydrogen phosphate, potassium dihydrogen phosphate, potassium acid phthalate, the water soluble constituents of cherry pits, 2-isopropoxycamphane, 2($\alpha$-hydroxyethoxy)camphane, and the like. Additionally, there may be included bactericides such as cetylperidium chloride, cetalkonium chloride, and the like, which function both as bactericide and as a surfactant. There may also be included antioxidants, mold inhibitors such as propionic acid and its salts, and phenols and phenolic salts such as sodium pentachlorophenol. Pigments and dyes may also be included, most advantageously, in the slurry fed to the vacuum filter, for example, along with the flocculating agent added to improve the filtration.

The basic animal litter composition of that invention is prepared from rejects of a secondary fibre plant. The solids in these rejects consist essentially of about 50 percent to about 90 percent cellulose and from about 10 percent to about 50 percent paper-making mineral filler which is chiefly kaolin or china clay. These rejects are de-watered, cut into pieces, mixed with the deodorant or other additives, pelletized and dried. To give a pelleted and dried material containing in addition to the solids of the rejects which consist of about 50 percent to about 90 percent cellulose and about 10 percent to about 50 percent mineral filler, about 1 percent to about 10 percent deodorizing material on a dry weight basis.

This patent, as well, was not commercially attractive because of the amount of calorific energy needed to dry the pellets, which initially contained from 32-40% water.

It is therefore one object of this invention to provide a commercially useful process for pelletizing clay "fines" to form absorptive pellets of useful size.

It is another object of this invention to provide a commercially useful process for pelletizing clay "fines" into absorptive pellets of useful strength.

SUMMARY OF THE INVENTION (i) Aims of the Invention

It is yet another object of this invention to provide a process for pelletizing clay "fines" by compactly forming the clay "fines" into useful absorptive pellets having the desired stability under most environmental conditions.

It is still another object of this invention to provide a commercially useful process for pelletizing "fines" of sorptive minerals into absorptive pellets of useful size that retain substantially the same absorbent capacity and bulk density as the original material.

(ii) Statement of Invention

The present invention is predicated on the fact that the clay "fines" are mixed and blended with an adhesive-type soluble lignin, and that the clay lignin mixture is then extruded through a pellet mill operated under such condition of pressure and shear that the moisture is flashed off in-situ to a moisture content in the pelleted material of 5% or less.

This invention provides a process for making pellets from clay "fines" having open pore spaces therein, the fines including mineral particles that will pass through a 30-50 mesh screen, the process comprising: (a) mixing the clay "fines" in a mixing apparatus with an aqueous solution of lignin; (b) transferring the moistened clay-lignin particles from the mixing apparatus to a disc pelletizer having a screw conveyor to feed the moistened clay-lignin particles to a die, the die including a die stiffener ring, a roll assembly, an adjustable feed plow and a rapid pelletizing cartridge; and (c) forcing the moistened clay-lignin particles through the die to compact and to form the clay-lignin into a coherent mass of material and cutting that coherent mass from the die to form that material into pellets, the forcing through the disc pelletizer being under selected conditions of shear, substantially simultaneously to compact the clay-lignin particles into the coherent mass and to flash-off excess moisture to provide pellets having a maximum of about 5% by weight moisture so that a subsequent drying step is therefore unnecessary. The pellets so formed have an absorptive capacity in the open pore spaces approaching the capacity of the clay "fines" starting material.

This invention also provides absorbent pellets comprising an extruded, dried-in-situ mixture of clay "fines" and lignin.

This invention also provides a continuous method for the preparation of absorbent pellets comprising: 1. transferring clay "fines" to a bulk storage area and continuously transferring the clay "fines" to a pelletizing apparatus; 2. continuously transferring an aqueous solution of lignin to the pelletitizing apparatus; 3. continuously mixing the clay "fines" with the aqueous solution of lignin to form a moistened mixture of clay-lignin particles; and 4. forcing the moistened clay-lignin particles through a die compactly to form the clay-lignin into a coherent mass of material and cutting the coherent mass from the die to form the material into pellets, the forcing being under selected conditions of shear substantially to flash-off excess moisture to provide pellets having a maximum of about 5% by weight moisture.

(iii) Other Features of the Invention

Other features of the process embodiment of this invention include the following:

(a) the lignin is provided in the range of about 8–about 15% by weight, desirably about 8–about 12½% by weight;

(b) the pellets are to be used as a cat box absorbent, and calcined clay "fines" are used, the clay "fines" having the open pore spaces therein and including particles of a size to pass through a 30 mesh screen;

(c) a deodorizer and/or a bactericide and/or an antioxidant and/or a mold inhibitor may be mixed with the clay-lignin composition forming pellets, or with the formed pellets;

(d) the pellets may be formed of a range in size from approximately 1/16" to 3/16:; and (e) the clay fines may be of Georgia clay [$Al_2O_3.2SiO_2.2H_2O$].

Other features of the composition embodiment of this invention include the following:

(f) the clay fines are of a size passing through 30 mesh;

(g) the amount of lignin is about 8–about 15% by weight, desirably about 8–about 12½% by weight, based on about 100 lbs of clay "fines"

(h) the clay is Georgia clay [$Al_2O_3.2SiO_2.2H_2O$]; and (i) the pellets are to be used as a cat box litter, and include a deodorizer and/or a bactericide and/or a antioxidant and/or a mold inhibitor incorporated therewith.

Other features of the method embodiment of this invention include the following:

(j) the method includes the steps of 5. continuously transferring the pellets to a pellet bulk storage area; and 6. continuously bagging the pellets;

(k) the clay "fines" are transferred to such bulk storage area by means of a vacuum pump;

(l) the mehtod includes the step of providing air filter means associated with the pellet bulk storage area; and (m) the method includes the step of providing externally generated heat to the pelletizing apparatus to assist in drying the pellets.

(iv) Generalized Description of the Invention

There are several commercial types of lignin which may be used in the practice of this invetion, although their application may vary according to differences in their alkalinity, etc. The lignin which preferably should be used is a purified sodium salt of lignin which is soluble in water and in alkali. The term "lignin" as used herein generally includes various forms of the substance or mixture of substances which are part of that fraction of woody tissue known as lignin. It is the major noncarbohydrate constituent of wood and woody plants, comprising about one fourth of may such materials. It functions as a natural plastic binder for the cellulose fibers. Its chemical composition has been given as $(C_{10}H_{13}O_3)_x$ but this is undoubtedly oversimplified. It is not thought to be a three-dimensional polymer of coniferyl alcohol, $C_6H_3(OH)(OCH_3)CH:CHCH_2OH$ or other guaiacylpropane derivatives. Lignin is removed from wood by both the sulfate and soda paper pulp processes, and limited amounts have been recovered from these sources and other wood waste.

The amount of lignin in the absorbent pelleted clay may vary over wide limits. Amounts which have been found to be suitable are from about 0–about 15% by weight, desirably about 8–about 12½% by weight, based on about 100 lbs of clay "fines".

The clay "fines" useful in the present invention are any of the aluminum silicate materials, which are plastic when wet. Typical minerals comprising the major proportion of the useful clay "fines" are the following:

kaolinite, $Al_2O_3.2SiO_2.2H_2O$
hallosite, $Al_2O_3.3SiO_2.2H_2O$
montmorillonite, $(Mg,Ca)O.Al_2O_35SiO_2.nH_2O$
illite, $K_2O, MgO, Al_2O_3, SiO_2, H_2O$; and
Georgia clay, $Al_2O_3.2SiO_2.2H_2O$.

In general terms, a sufficient amount of a solution of the adhesive-type soluble lignin, about 25–about 30 lbs, an aqueous solution containing about 50% by weight solids (i.e. lignin) is continuously mixed with and blended with about 100 lbs Georgia clay "fines" of a size of 30–50 mesh in a blending mill to provide a semi-slurry having about 25–about 30% by water by weight. The blending mill may be any suitable mill. This mill should preferably include a feeder/conditioner and a feeder/distributor where the lignin solution and the clay fines are suitably mixed.

In carrying out the method of the present invention, one of the most important features is the mixing of the aqueous solution of the lignin with the particles of the clay, which can be either raw or calcined, and which has particle size less than 30–50 mesh.

The amount of the aqueous solution of the lignin that is added depends on the absorbent capacity of the material and should preferably be enough to fill the pore space in the particles. It is definitely desirable to avoid forming a slurry. It has been generally found that added water in the range of about 25–about 35% by weight to the sorptive mineral works satisfactorily; about 30% by weight appears to be the most optimum.

It would seem that the major error in prior attempts to pelletize sorptive mineral "fines" was the failure to realize that the pelletizing machine actually compressed the particles of clay fines during the forming process, thereby destroying the porosity of the particles. By adding water and lignin to the "fines", the particles, when formed into pellets, are actually compacted together rather than compressed, with the lignin solution preserving the integrity of the original pore space. The lignin also acts as a lubricant on the surface of the particles to facilitate the forcing of the pellets through the die.

The "fines" and the aqueous solution of lignin are mixed thoroughly in any suitable mixer and are then fed into the pelletizing machine for compacting the same into the pellets.

In the procedure of carrying out the method of an aspect of the present invention, the disc pelletizer includes a screw conveyor to feed the clay-lignin mixture to a die. The die includes a die stiffener ring, a roll assembly, an adjustable feed plow and a rapid pelleting cartridge. The pressure is controlled to maximize absorbing of the pellets, and the shear rate is controlled to flash-off moisture to a value of 5%-2%. It has been found that the lignin solution improves the drying of the clay pellets since it serves to disperse the moisture uniformly therethrough and expands to preserve the pore volume.

After the pellets have been formed, since, as mentioned above, they are dried in-situ to 5%-2% moisture, the pellets need not be subjected to a subsequent drying step, but instead the pellets are screened to remove any dust which may have developed in the process and are passed either directly or indirectly to a bagging machine where they are packed for shipment.

BRIEF DESCRIPTION OF THE DRAWINGS

The accompanying drawing shows an automated plant layout for the manufacture of absorbent pellets from clay "fines".

DESCRIPTION OF PREFERRED EMBODIMENTS (i) Description of the Drawing

As seen in the schematic drawings, clay "fines" arriving from a rail car at 10 are fed via line 11 to vacuum pump 12 and through line 13 to the top of clay "fines" bulk bin 14 fitted with a convention dust collector 15.

A 50% by weight aqueous solution of lignin arriving from a rail car at 16 and is fed via liquid feeding line 17 to the mixing chamber of a pellet mill 18 as described above. Here, it is mixed with clay "fines" fed by gravity from clay "fines" bulk bin 14. The moist mixture of clay "fines" and lignin is pelleted by the pellet mill under such conditions of shear that moisture is flashed-off in-situ to provide pellets of about 5%-about 2% by weight moisture. If unforseen problems arise, however, the pellet mill 18 may be provided with an outlet line 19 of a flash drier 20 to assist in the flashing off of excess moisture but in the practice of this invention such drying step is unnecessary, but is optimal.

The pellets, having a moisture content of about 5%--about 2% by weight are led via line 21 and vacuum pump 22 through line 23 to the top of a pellet bulk bin 24 provided with an air filter to exclude "fines". The pellets are then fed by gravity from pellet bulk bin 24 to a bagger 26.

(ii) Generalized Description of Preferred Embodiments

The pellets that are formed utilizing the method of this invention so far described with respect to the clay "fines" are strong, uniform inshape and size, and have an absorbent capacity and bulk density that approaches the original material. They are generally of a size of about 1/16"–about 3/16" and have a pore volume which corresponds to about 90–about 95% of the clay "fines".

One of the truly beneficial features of this invention is the versatility which is achieved. That is, by varying the dies in the pelletizing machine, for instance, clay "fines" can be compactly formed into pellets of varying sizes and shapes to be used as cat absorbent, oil and grease absorbent, decorative mulch, nesting material, soil conditioner, and sanitary absorbent, to effect the desired aesthetic properties.

For use as cat box litter, a commercially available deodorizer, e.g. pine oil, wintergreen, sodium bicarbonate, chlorophyll, sodium dihydrogen phosphage, potassium dihydrogen phosphate, potassium acid phthalate, the water soluble constituents of cherry pits, 2-isopropoxycamphane, 2($\beta$-hydroxyethoxy)camphate, or the like can be added to neutralize odorous spills, e.g. cat odors. Additionally, bacteriocides, e.g. cetylperidium chloride, cetalkonium chloride or the like may be included, which function both as a bacteriocide and as a surfactant. Antitoxidants and/or mold inhibitors e.g. propionic acid and its salts, and phenols and phenolic salts, e.g. sodium pentachlorophenol as well as pigments and dyes may also be included.

(iii) Example of the Invention

One example of the method of an aspect of this invention is described hereinbelow.

Cat box absorbent a. Each 100 lbs of Georgia clay "fines" passing through 30 mesh is mixed thoroughly with a sufficient volume, e.g. 25–35 lbs of a 50% by weight aqueous solution of lignin to provide a semi-slurry having, e.g. 12.5% solids;

b. The mixture of (a) above is fed into a pellet machine which forms compacted pellets therefrom of approximately 1/16"–3/16" mesh;

c. The pellets are screened to remove any dust; and d. The pellets are bagged.

SUMMARY

What has been described, therefore, is a unique process for pelletizing clay "fines" into pellets of controlled stability and of useful size that retain substantially the same absorbent capacity and bulk density as the original material.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. A process for making pellets from clay "fines" having open pore spaces therein, said fines including particles that will pass through a 30–50 mesh screen, said process comprising:

a. mixing said clay "fines" in a mixing apparatus with an aqueous solution of lignin;

b. transferring said moistened clay-lignin particles from said mixing apparatus to a disc pelletizer having a die and a screw conveyor to feed said moistened clay-lignin particles to said die, said die including a die stiffener ring, a roll assembly, an adjustable feed plow and a rapid pelletizing cartridge; and c. forcing said moistened clay-lignin particles through said die to compact and to form said clay-lignin into particles into a coherent mass of material and cutting said coherent mass from said die to form said material into pellets, said forcing through said disc pelletizer being under selected conditions of shear, substantially simultaneously to compact said clay-lignin particles into said coherent mass and to flash-off excess moisture to provide pellets having a maximum of about 5% by weight moisture, a subsequent drying step therefore being rendered unnecessary;

said pellets having open pore spaces therein and a liquid absorptive capacity in said open pore spaces substantially equal to the capacity of said clay "fines" starting material.

2. The process of claim 1 wherein said aqueous solution of lignin is provided in the range of about 8 to about 15 lbs based on 100 lbs of clay "fines".

3. The process of claim 2 wherein said aqueous solution of lignin is provided in the range of about 8 to about 12½ lbs based on each 100 lbs of clay "fines".

4. The process of claim 1 for the making of said pellets to be used as a cat box absorbent, wherein calcined clay "fines" are used, said clay "fines" having said open pore spaces therein including particles of a size to pass through a 30 mesh screen.

5. The process of claim 1 for the making of said pellets to be used as a cat box absorbent wherein calcined clay "fines" are used having said open pore spaces therein, and including particles of a size to pass through a 30 mesh screen; and further wherein at least one of a deodorizer, a batericide, an antioxidant, and a mold inhibitor is included.

6. The process of claim 1 for the making of said pellets to be used as a cat box absorbent, wherein calcined clay "fines" are used having said open pore spaces therein and including particles of a size to pass through a 30 mesh screen; and further wherein said pellets are approximately 1/16″–3/16″ in size.

7. The process of claim 1 for the making of said pellets to be used as a cat box absorbent wherein calcined clay "fines" are used having said open pore spaces therein, and including particles of a size to pass through a 30 mesh screen; said clay "fines" being of Georgia clay [$Al_2O_3.2SiO_2.2H_2O$].

8. Absorbent pellets made by the process of claim 1 comprising an extruded, dried-in-situ mixture of clay "fines" and an aqueous solution of lignin.

9. The absorbent pellets of claim 8 wherein said clay "fines" are of a size passing through 30 mesh.

10. The absorbent pellets of claim 8 wherein the amount of aqueous solution of lignin is about 8 to about 15 lbs based on each 100 lbs of clay "fines".

11. The absorbent pellets of claim 10 wherein the amount of aqueous solution of lignin is about 8 to about 12½ lbs based on each 100 lbs of clay "fines".

12. The absorbent pellets of claim 8 wherein said clay is Georgia clay [$Al_2O_3.2SiO_2.2H_2O$].

13. The absorbent pellets of claim 8 including at least one of a deodorizer, a bactericide, an antioxidant, and a mold inhibitor to provide cat litter box absorbent pellets containing the same.

14. The absorbent pellets of claim 8, wherein said clay is Georgia clay ($Al_2O_3.2SiO_2.2H_2O$) and further including at least one of a deodorizer, a bactericide, an antioxidant, and a mold inhibitor to provide cat box litter absorbent pellets containing the same.

15. A continuous method for the preparation of absorbent pellets comprising:

1. continuously transferring clay "fines" to a bulk storage area and continuously transferring said clay "fines" to a disc pelletizer having a screw conveyor and a die, said die including a die stiffener ring, a roll assembly, an adjustable feed plow and a rapid pelletizing cartridge;

2. continuously transferring an aqueous solution of lignin to said disc pelletizer;

3. continuously mixing said clay "fines" with said aqueous solution of lignin to form a moistened mixture of clay-lignin particles; and 4. continuously forcing said moistened mixture of clay-lignin particles through said die to compact and to form said clay-lignin into a coherent mass of material and cutting said coherent mass from said die to form said coherent mass into pellets, said forcing through said die being under selected conditions of shear substantially simultaneously to compact said moistened clay-lignin particles into said coherent mass and to flash-off excess moisture to provide pellets having a maximum of about 5% by weight moisture so that a subsequent drying step is rendered unnecessary.

16. The continuous method of claim 15 including the steps of 5. continuously transferring said pellets to a pellet bulk storage area and 6. continuously bagging said pellets.

17. The continuous method of claim 15 including the step of providing air filter means associated with said pellet bulk storage area.

18. The continuous method of claim 15 wherein said clay "fines" are transferred to such bulk storage area by means of a vacuum pump.

19. The continuous method of claim 15 including the step of providing a dust collecting area associated with said bulk storage area.

20. The continuous method of claim 15 including the step of providing externally generated heat to said pelletizing apparatus to assist in drying said pellets.

* * * * *